June 21, 1966     W. E. BELL ETAL     3,257,608
OPTICAL MAGNETOMETERS
Filed Feb. 2, 1961
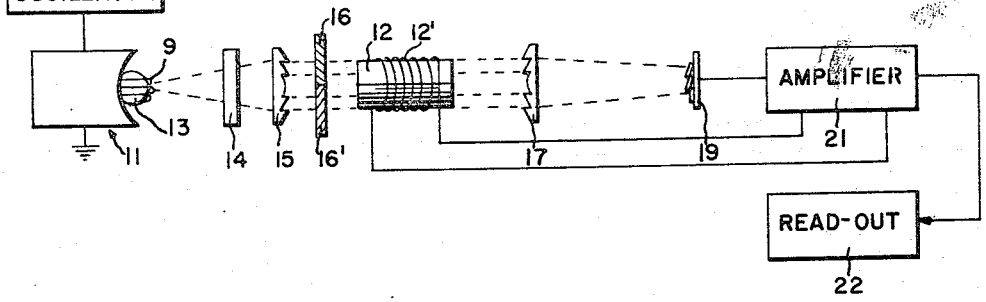
FIG.1
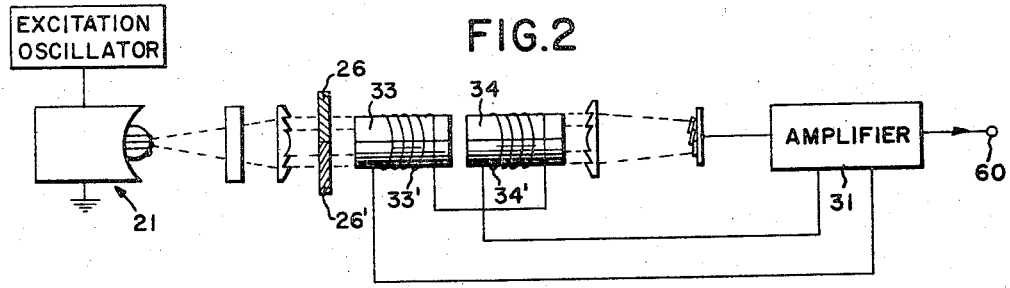
FIG.2
FIG.3
INVENTORS
WILLIAM E. BELL
ARNOLD L. BLOOM
BY
ATTORNEY

3,257,608
OPTICAL MAGNETOMETERS
William E. Bell, Palo Alto, and Arnold L. Bloom, Menlo Park, Calif., assignors to Varian Associates, Palo Alto, Calif., a corporation of California
Filed Feb. 2, 1961, Ser. No. 86,697
11 Claims. (Cl. 324—.5)

The invention described herein was made in the performance of work under NASA contract and is subject to the provisions of Sec. 305 of the National Aeronautics and Space Act of 1958, Public Law 85-568 (72 stat. 435; 42 U.S.C. 2457).

The present invention relates in general to the measurement of weak magnetic fields and more particularly to an orientation independent optical magnetometer-oscillator for use in airborne geophysical prospecting and the like.

Recently there has been developed a self-oscillating rubidium vapor magnetometer based on the teachings of the copending U.S. patent application of Hans G. Dehmelt entitled, "Modulation of a Light Beam by Absorbing Quantum Systems Exhibiting a Periodically Varying Alignment," Serial No. 653,180, filed April 16, 1957, now Patent No. 3,150,313. Briefly, this instrument comprises a source of circularly polarized rubidium "D" line radiation which is directed through an absorption cell containing rubidium vapor and is intercepted by a suitable photodetector. The ground state of the rubidium atoms in the absorption cell is split into a plurality of magnetic sublevels by an external unidirectional magnetic field—for example, the earth's magnetic field. The circularly polarized rubidium radiation is more strongly absorbed by atoms in one set of sublevels than by those in the other sublevels so that the non-absorbing sublevels become overpopulated with respect to the absorbing sublevels by the process of optical pumping to produce a net alignment of the magnetic moments of the atoms. A radio frequency coil surrounds the absorption cell so that the alternating magnetic field of the coil which is at the frequency of the sublevel separation produces a magnetic resonance precession of the magnetic moments of the atoms which periodically varies the alignment so that, in effect, the population excess is periodically exchanged between said first and second sublevel sets, and as a result the rubidium light passing through the absorption cell obtains a well-defined periodic intensity modulation at the precession frequency. This intensity modulated beam is intercepted by the photodetector to produce an alternating electric signal which is amplified and fed back to the radio frequency coil with the proper phase for sustaining the beam modulation by forced precessions of the magnetic moments, thereby affecting continuous self-sustained oscillation at the precession frequency. Since this frequency is a substantially linear function of the external unidirectional field, the oscillation frequency provides a continuous indication of magnetic field intensity.

Rubidium vapor magnetometer-oscillators of the above-described type have demonstrated reliable operation with sensitivities of better than .01 gamma (1 gamma=$10^{-5}$ gauss), this being 10 to 100 times as sensitive as flux gate and proton precession magnetometers now being used for airborne geophysical surveys. However, the usefulness of such optical magnetometer instruments for airborne and other mobile applications is limited in view of the following sources of orientation dependence:

(1) The resonance line representing optical absorption as a function of the frequency of the alternating magnetic field applied to the absorption cell is actually split into several closely spaced lines, due to the slight differences in the frequency separation of the various magnetic sublevels. Since the contributions of the several lines are not in general equal, the total absorption line is an asymmetrical one, the shape of which depends on the direction of the light beam relative to the unidirectional field. Thus, as the instrument is rotated, a heading error is introduced due to variations in the frequency at which the conditions for sustaining oscillation is met.

(2) The phase relationship between the feedback signal applied to the absorption cell and the intensity modulation of the light beam is a function of the relative orientation between the direction of the resonance frequency magnetic field vector, the direction of the unidirectional magnetic field, and the direction of the light beam. In the most favorable cases in which the resonance frequency magnetic field vector is constrained to be collinear with the light beam, a phase shift of +90° is encountered with the light beam directed in one hemisphere (with reference to the direction of the unidirectional field), and a phase shift of −90° is encountered with the light beam directed in the other hemisphere. Thus, when the total phase shift about the oscillator loop is proper for oscillation in one hemisphere, a so-called "hemisphere effect" exists whereby the phase shift will not be proper for oscillation when the instrument is oriented in the other hemisphere, unless the phase of the feedback signal is simultaneously reversed.

It is the principal object of the present invention to provide an improved optical magnetometer in which one or more of the above-described sources of orientation dependence is reduced.

One feature of the present invention is the provision of an optical magnetometer oscillator utilizing a split polarizer for the reduction of heading error due to resonance line asymmetries.

Another feature of the present invention is the provision of an optical magnetometer utilizing a pair of separately enriched rubidium vapor absorption cells which are arranged in series to be pumped from a common light source and monitored by a common light detector such that the hemisphere effect is overcome.

Still another feature of the present invention is the provision of a read-out arrangement for a magnetometer according to the previous paragraph in which the scale reference is orientation-independent.

These and other features and advantages of the present invention will become apparent upon a perusal of the following specification taken in connection with the accompanying drawings, wherein:

FIG. 1 is a schematic circuit diagram of a magnetometer oscillator utilizing a split polarizer in accordance with the present invention, FIG. 2 is a schematic second diagram of a magnetometer oscillator utilizing absorption cells enriched separately in rubidium-85 and ribidium-87 in accordance with the present invention, and FIG. 3 is a block diagram of a magnetometer readout in accordance with the present invention.

Referring now to FIG. 1 the light source 11 produces a rubidium light beam directed through rubidium vapor absorption cell 12 which is preferably divided into two separately sealed compartments. The light source 11 is preferably a high spectral purity, low noise electrode discharge lamp of the type described in U.S. patent application of William E. Bell and Arnold L. Bloom, "Electrodeless Discharge Lamp Apparatus," Serial No. 56,412, filed September 16, 1960, now U.S. Patent 3,109,960, comprising a small discharge bulb 13 of natural rubidium vapor mixed with a starting medium of krypton gas closely coupled to an external R.F. discharge coil 9 which is energized by an excitation oscillator 20. The light beam successively passes through an interference filter 14 which suppresses the 7800 angstrom "$D_2$" line while passing the 7948 angstrom "D₁" line thereby enhancing optical pumping, a plastic sheet Fresnel collimating lens 15, a split circular polarizer 16 and 16', absorption cell 12, a second collimating lens 17, and is focused on a photocell 19 which, for example, comprises a mosaic of silicon solar cells soldered together like shingles in series fashion as more fully described in the copending U.S. patent application of Kenneth A. Ruddock et al., entitled, "Optical Magnetometer and Gradiometer," Serial No. 56,484, filed September 16, 1960.

The absorption cell compartments 12 contain a ribidium vapor which is preferably isotopically enriched with respect to either rubidium-85 or rubidium-87, mixed with a buffer gas such as neon to reduce disorienting wall collision thereby providing longer relaxation times and consequently the narrow line widths required for high sensitivity. In the case of rubidium-85, the polarized and filtered light beam will be modulated at a precession frequency of 4.66 cycles per gamma, and for rubidium-87, 7.00 cycles per gamma. For example, in an average earth field of 0.5 gauss, the precession frequency of rubidium-85 is 233 kc. This intensity modulation is converted by the photocell 19 to an alternating electrical signal of the same frequency which is amplified by the amplifier 21 and fed back to the absorption cell through coaxial coil 12' in the form of an alternating magnetic field which maintains forced precessions of the rubidium atoms. The feedback signal which has a frequency proportional to the intensity of the unidirectional magnetic field being measured is fed to a read-out circuit 22 where it may be combined with a signal from a crystal controlled oscillator at a frequency corresponding to a reference field intensity to produce a difference frequency which is indicated, for example, by an analogue output frequency meter coupled to a graphic recorder. Other methods for measuring the feedback frequency as an indication of the unknown magnetic field intensity will be obvious to those skilled in the art.

In the copending U.S. patent application of James T. Arnold, entitled, "Optical Magnetometers," Serial No. 62,480, filed October 13, 1960, and now abandoned in favor of continuation-in-part application Ser. No. 250,460 filed January 7, 1963, there is disclosed and claimed a generic technique for reducing the heading error of an optical magnetometer in which two light beams are used, each having an opposite sense of circular polarization with respect to the unidirectional magnetic field direction. As a result, the atoms in magnetic sublevels which are non-absorbing to the one beam will be absorbing to the other beam so that the optical absorption resonance line associated with one cell is the mirror image of that associated with the other cell and the composite of the two lines is substantially symmetrical. According to the present invention, there is provided a particularly simple structure for practicing this technique wherein a single lamp is used and the circular polarizer is split so that one half 16 of the polarizer is a left-hand circular polarizer and the other half 16' is a right-hand circular polarizer, the two halves having substantially equal transmission and polarization efficiencies. Thus, the light beam is formed into two oppositely polarized beam portions which pass through the separate compartments of the absorption cell 12 and are combined in a single photocell 19 to produce the desired symmetrical line. It is further noted that the use of the single light beam which is divided to permit the presence of both senses of circular polarization relative to the unidirectional magnetic field will also reduce the heading error when used, for example, in an optical magnetometer of the type described, for example, in the copending U.S. patent application of Hans G. Dehmelt, "Gyromagnetic Resonance of Optically Aligned Alkali Atoms," Serial No. 649,191, filed March 28, 1957, and now abandoned in favor of continuation-in-part application Ser. No. 350,887, now abandoned, in favor of continuation application Ser. No. 407,422 filed October 29, 1964.

In order to maintain a condition of self-sustained oscillation, the total phase shift through the absorption cell 12, photocell 19 and amplifier 21 is ideally zero. Since the phase shift encountered at the absorption cell 12 is 90°, a net phase shift in the photocell 19 and amplifier 21 of 270° is required. For fields greater than about 10,000 gamma, the shunt capacitance of the equivalent circuit of the silicon mosaic photocell 19 will be sufficient to yield a 90° phase shift so that the amplifier 21 is designed to exhibit 180° phase shift. At lower fields phase shift compensating networks may be used to compensate for the departure of the photocell phase shift from 90°.

When the instrument now is rotated so that relative direction between the light beam and the unidirectional magnetic field is reversed, the phase shift through the absorption cell 12 is reversed by the above-described hemisphere effect and the instrument will no longer oscillate. One means of overcoming this hemisphere effect, disclosed in the aforementioned application of Kenneth A. Ruddock et al., is to provide an automatic electronic switch which reverses the output connections of the feedback amplifier 21 whenever the oscillation tends to die out.

In FIG. 2 there is disclosed another novel means using two separately enriched tandem absorption cells for overcoming the hemisphere effect in which the switch and its associated circuit complexities are eliminated.

Referring in detail to FIG. 2, an absorption cell 33 isotopically enriched with rubidium-85, and a second rubidium vapor absorption cell 34 isotopically enriched with rubidium-87 are monitored by the single natural rubidium lamp 21. The R.F. coils 33' and 34' respectively surrounding the cells 33 and 34 are wound in opposite senses so that the phase shift through one of the cells is suitable for sustaining oscillation in one magnetic hemisphere, and the phase shift through the other cell is suitable for sustaining oscillations in the opposite hemisphere. Since the precession frequencies for the two isotopes are substantially different, no magnetic resonance precessions will occur in the absorption cell whose phase shift is not suitable for oscillations so that it does not affect the light intensity modulation. Thus, when the instrument is rotated so that the light beam is projected to the other magnetic hemisphere, oscillations are continuously maintained, although the controlling isotope is changed and hence the precession rate is changed. Thus, one feature of this optical oscillation is that a frequency shift may be used to provide an indication of the direction of the external magnetic field vector. Further, it should be noted that the split polarizer 26, 26' may be omitted from this embodiment if the heading error is of no concern, or is compensated by other means.

Referring now to FIG. 3 there is shown in block diagram form a read-out arrangement for the magnetometer of FIG. 2 in which the scale reference is orientation-independent. The input 60 to the block diagram is developed from the amplifier 31 of FIG. 2. This input is channeled into one of two similar paths, the only difference being in the frequency of the signal in each path. Considering first the upper path, the mixer 61 combines the rubidium-85 controlled signal from the amplifier with the output from a crystal oscillator 62. The output from the mixer 61 is fed to a low-pass filter 63, a rate meter 64 and to a visual graphic recorder 65. In a typical operation let us assume that the magnetometer is aligned with relation to the unidirectional magnetic field such that the modulation is due to the rubidium-85 cell in an earth's field intensity of 50,000 gamma so that the output signal frequency from the amplifier 31 into the mixer would be 233 kc. (4.66 cycles per gamma). This signal is mixed with the constant output of 232 kc. from the crystal oscillator 62. The low band pass filter 63 (for example, an audio transformer) passes only the difference frequency of 1 kc. The output from the low pass filter 63 is then fed to the rate meter 64 which produces a D.C. output signal proportional to the frequency of input signal. The output from the rate meter 64 is then fed to the graphic recorder 65 for a visual presentation of the strength of the magnetic field.

Now going back to input 60 again, let us assume the direction of the instrument has been shifted 180° and the oscillation is controlled by the rubidium-87 cell modulated at 7 cycles per gamma. The output from the amplifier is now 350 kc. at 50,000 gamma. This output is mixed in mixer 61' with the output from a crystal oscillator 62' having an output frequency of 349 kc. The output from the mixer will be the difference frequency of 1 kc. This output is passed by the low pass filter 63'. The output from the low pass filter 63' is fed into a rate meter 64' which is adjusted to ⅔ the output sensitivity of the rubidium-85 rate meter so that the output from both rate meters will be equal in any given magnetic field. The output from the ratemeter 64' is then fed to the graphic recorder for visual presentation.

This circuit is designed to have a dynamic range of about 1% of the earth's field of 50,000 gamma with a sensitivity of .01 gamma. This is considered ideal for geophysical prospecting. If it is desired to measure weaker magnetic fields, a different crystal oscillator should be used to keep the difference frequency from the mixer to less than 2 kc.

The application of the teachings of the present invention to various instruments wherein the alignment of alkali atoms or other suitable quantum systems is monitored by the absorption of optical radiation of such spectral characteristics as to exhibit differential sublevel absorption, will be readily apparent to those skilled in the art.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an optical magnetometer, the combination comprising: absorption cell means disposed in an optical path containing an assemblage of quantum systems which may precess in a unidirectional magnetic field, means for passing optical radiation along the optical path through separate portions of said absorption cell means with such spectral characteristics as to be differentially absorbed with respect to the magnetic sublevels of said quantum systems, said means for passing optical radiation through said absorption cell including a polarizer structure disposed along the optical path and divided into two separate portions of different polarization so that the optical radiation portions passed through separate portions of said absorption cell means have inverse distributions of sublevel absorption, alternating magnetic field means coupled to said absorption cell means for producing a magnetic field at the precession frequency of said quantum systems, a single photocell means disposed along the optical path responsive to the intensity of the optical radiation which has passed through the portions of said absorption cell means for providing a signal which varies in accordance with the alternating magnetic field frequency at which resonance precessions of said quantum systems are produced.

2. The combination of claim 1 wherein the respective portions of said polarizer structure are coplanar and effect circular polarization of opposite senses.

3. The combination of claim 2 wherein said assemblage of quantum systems are alkali atoms in vapor form.

4. The combination of claim 2 having means for coupling the output of said optical radiation responsive means to said alternating magnetic field means to thereby establish a condition of self-sustained oscillation, the frequency of which indicates the intensity of said unidirectional magnetic field.

5. In an optical oscillator, the combination comprising: a pair of adjacent optical absorption cells each containing an assemblage of quantum systems which may precess at a different rate in a unidirectional magnetic field, means for passing optical radiation through said absorption cells with such spectral characteristics as to be differentially absorbed with respect to the magnetic sublevels of said quantum systems whereby the intensity of the radiation passing through each cell is intensity modulated at a frequency which depends on the precession rate of said quantum systems, photocell means for converting the intensity modulation of the radiation passing through the absorption cells into a single alternating electrical signal, means for coupling said electrical signal to both of said absorption cells in the form of an alternating magnetic field of opposite phase at each cell to produce forced precessions of said quantum systems thereby effecting self-sustained oscillation of said electrical signal.

6. The combination of claim 5 wherein said optical absorption cells contain rubidium vapor, one cell being enriched with rubidium-85 and the other being enriched with rubidium-87.

7. In an optical magnetometer, the combination comprising: a pair of adjacent optical absorption cells each containing an assemblage of quantum systems which may precess at a different rate in a unidirectional magnetic field of unknown intensity, means for passing optical radiation through said absorption cells with such spectral characteristics as to be differentially absorbed with respect to the magnetic sublevels of said quantum systems whereby the intensity of the radiation passing through each cell is intensity modulated at a frequency which depends on the precession rate of said quantum systems, photocell means for converting the intensity modulation of the radiation passing through the absorption cells into a single alternating electrical signal, means for coupling said electrical signal to both of said absorption cells in the form of an alternating magnetic field of opposite phase at each cell to produce forced precessions of said quantum systems thereby effecting self-sustained oscillation of said electrical signal, means for converting said alternating electrical signal into an output signal which is a measure of the field intensity of said unidirectional magnetic field.

8. The combination of claim 7 wherein said optical absorption cells contain rubidium vapor, one cell being enriched with rubidium-85 and the other being enriched with rubidium-87.

9. The combination of claim 8 whereby said means for converting said alternating electrical signal into an output signal includes two separate channels, one for measuring the output of the rubidium-85 vapor cell and the other for measuring the output of the rubidium-87 vapor cell, the outputs of said two channels being fed to a graphic recorder for visual presentation of the output of each separate channel.

10. The combination according to claim 9 whereby each of said channels includes oscillator means producing a constant frequency output, means for mixing the output of said oscillator means and said alternating electrical signal, filter means for passing the difference frequency of said mixing means to a rate meter, said rate meter converting the difference frequency into a D.C. signal proportional to the difference frequency, the sensitivity of the rate meter for the rubidium-87 channel being approximately two-thirds of the sensitivity of the rate meter for the rubidium-85 channel so that the rate meter output of both channels has the same scale reference, and recorder means receiving the D.C. signal from each of said rate meters for recording the outputs of each of said channels thereby giving a continuous orientation-independent presentation of the unidirectional magnetic field intensity.

11. In an optical magnetometer, the combination comprising: a pair of adjacent rubidium vapor optical absorption cells, one cell being enriched with rubidium-85 and the other cell enriched with rubidium-87 whereby the atoms in each cell precess at different rates in a unidirectional magnetic field of unknown intensity, means including a circular polarizer divided into two separate portions having opposite senses of circular polarization for successively passing optical radiation through said absorption cells with such spectral characteristics as to be differentially absorbed with respect to the magnetic sublevels of said rubidium atoms whereby the intensity of the radiation passing through each cell is intensity modulated at a frequency which depends on the precession rate of said atoms, photocell means for converting the intensity modulation of the radiation passing through the absorption cells into an alternating electrical signal, means for coupling said electrical signal to said absorption cells in the form of an alternating magnetic field of opposite phase at each cell such that the phase shift in the electrical signal due to one of the cells is suitable for sustaining oscillation in one magnetic hemisphere and the phase shift in the electrical signal due to the other cell is suitable for sustaining oscillations in the opposite hemisphere.

References Cited by the Examiner
UNITED STATES PATENTS 3,054,069   9/1962   Kastler et al. _____ 88—1

OTHER REFERENCES

Bloom, Optical Pumping, article reprinted from Scientific American, October 1960, 10 pp.

Bender et al., Physical Review Letters, vol. No. 9, Nov. 1, 1958, pp. 311–313 incl.

Mansir, Electronics, vol. 33, Aug. 5, 1960, pp. 47–51 incl.

Kastler, Journal de Physique et le Radium, vol. 11, June 1950, pp. 255 to 265 incl.

Bell et al., Physical Review, vol. 107, No. 6, Sept. 15, 1957, pages 1559 to 1564 incl.

CHESTER L. JUSTUS, *Primary Examiner.*

MAYNARD R. WILBUR, *Examiner.*